United States Patent
Engels et al.

(10) Patent No.: US 9,682,523 B2
(45) Date of Patent: Jun. 20, 2017

(54) SYSTEM AND METHOD OF MANUFACTURING COMPOSITE MODULES

(71) Applicant: Airbus Operations GmbH, Hamburg (DE)

(72) Inventors: Alexander Engels, Stade (DE); Pierre Zahlen, Stade (DE); Lars Meyer, Hamburg (DE)

(73) Assignee: Airbus Operations GmbH (DE)

( * ) Notice: Subject to any disclaimer, the term of this patent is extended or adjusted under 35 U.S.C. 154(b) by 34 days.

(21) Appl. No.: 14/522,776

(22) Filed: Oct. 24, 2014

(65) Prior Publication Data
US 2015/0118001 A1  Apr. 30, 2015

(30) Foreign Application Priority Data

Oct. 30, 2013  (EP) .................................... 13190839

(51) Int. Cl.
B65G 7/08  (2006.01)
B29D 99/00  (2010.01)

(52) U.S. Cl.
CPC ................. B29D 99/0014 (2013.01)

(58) Field of Classification Search
CPC ..... B21C 47/24; B08B 9/0848; B65G 47/252; B65G 2203/042; B65G 47/256; B29D 99/0014
USPC ............... 414/754, 760, 762, 763, 773, 779; 193/44
See application file for complete search history.

(56) References Cited

U.S. PATENT DOCUMENTS

| | | | |
|---|---|---|---|
| 2007/0289228 A1* | 12/2007 | Key | E04B 1/3205 52/86 |
| 2008/0092371 A1 | 4/2008 | Harrison | |
| 2008/0283662 A1* | 11/2008 | Park | B64C 1/066 244/118.5 |

FOREIGN PATENT DOCUMENTS

| | | |
|---|---|---|
| DE | 37 16 170 C1 | 6/1988 |
| EP | 0 967 163 A2 | 12/1999 |
| EP | 2591911 A1 * | 5/2013 |
| FR | 2 613 273 A1 | 10/1988 |
| WO | 96/06726 A1 | 3/1996 |

OTHER PUBLICATIONS

EP search report (13190839.4)(Apr. 16, 2014).

* cited by examiner

*Primary Examiner* — Stephen Vu
(74) *Attorney, Agent, or Firm* — Lerner, David, Littenberg, Krumholz & Mentlik, LLP

(57) ABSTRACT

A system for producing a fiber-reinforced composite module, such as a panel module, having an integrated stiffening structure for an aircraft or spacecraft includes a form core assembly station for assembling a plurality of form cores covered with reinforcing fiber layers to constitute at least one stiffening element of the integrated stiffening structure, a form core placement station which receives assembled form cores from the assembly station for placing or depositing the assembled form cores in or on a molding tool, and a turning station for rotating or inverting the assembled form cores. The turning station is configured to convey or transport the assembled form cores from the assembly station to the placement station. The turning station defines a path which is configured to rotate or invert the assembled form cores as they are conveyed or moved to the placement station.

11 Claims, 4 Drawing Sheets

SYSTEM AND METHOD OF MANUFACTURING COMPOSITE MODULES

FIELD OF THE INVENTION

The present invention relates to a system and a method of manufacturing a fibre-reinforced composite module, such as a panel module, having an integrated stiffening structure, and especially for use in an aircraft or spacecraft.

Thus, the systems and methods described herein are particularly suitable for use in the fabrication of airframe components or modules of aircraft or spacecraft, especially wing and tail-plane modules or structures, and it will be convenient to describe the invention herein in this exemplary context. It will be understood, however, that the described systems and methods are not limited to this application, but may be employed to manufacture body structures for various other vehicles, such as trains, automobiles, trucks, or ships. These systems and methods are therefore suitable for a range of nautical, aeronautical, automotive, and aerospace applications.

The inventors have developed a modular manufacturing system and method for producing fibre-reinforced modules, such as panel modules, having an integrated stiffening structure. The integrated stiffening structure is desirably co-cured with the outer surface or aerodynamic skin parts thereof to form a single, integral and unitary module without the need for additional fastening elements, such as rivets, between the elements of the stiffening structure and the external aero-dynamic surface or skin.

BACKGROUND OF THE INVENTION

Although the concept of co-curing components to produce an integral fibre-reinforced composite module is not new, current manufacturing concepts, especially for large modules, require complex, expensive and very heavy tooling, which makes the duplication of production lines difficult and prohibitively expensive. This, in turn, leads to excessive production times and production bottle-necks.

BRIEF SUMMARY OF THE INVENTION

It is therefore an idea of the present invention to provide a new and improved method and system for overcoming one or more of the problems discussed above. In particular, it would be useful to provide a new system and method of manufacturing modules from a fibre-reinforced composite material for an aircraft or spacecraft which may enable a faster and/or more automated production procedure.

In accordance with an embodiment of the invention, a turning apparatus for use in manufacturing a fibre-reinforced composite module, such as a panel module, is provided. Further, a system and method of manufacturing fibre-reinforced composite modules, such as panel modules, for an aircraft or spacecraft are also provided. In addition, the invention provides a vehicle, such as an aircraft.

According to one aspect, therefore, the invention provides a turning apparatus for rotating or inverting an assembly (or a pre-assembly) in manufacture of a fibre-reinforced composite module, especially a panel module, and having an integrated stiffening structure. The apparatus is configured to convey or transport the assembly from a first position, at which the assembly is received by the apparatus, to a second position, at which the assembly is discharged or released from the apparatus. The apparatus provides or defines a path from the first position to the second position, and the path rotates or inverts the assembly as it is conveyed or transported to the second position. The assembly or pre-assembly may include the module itself or part thereof and/or assembled components used in the module fabrication procedure.

In an embodiment, the path along which the apparatus is designed to convey or transport the assembly from the first position to the second position is configured to rotate or invert the assembly progressively as it is conveyed or transported from the first position to the second position. In other words, as the assembly moves in translation along the path, it undergoes a rotation or inversion. The axis of rotation (i.e. the axis about which the rotation effectively occurs) is spaced from the path of travel; i.e. it does not lie on the travel path from the first position to the second position. In this regard, the path in the turning apparatus from the first position to the second position is preferably at least partially curved or arcuate, and more preferably at least partially circular or elliptical; e.g. semi-circular or semi-elliptical. Thus, a centre of curvature of the curved or arcuate path may then correspond to an axis of rotation for the assembly (or pre-assembly) as it is rotated or inverted. The path is therefore preferably continuous and effects a translation as well as a rotation or inversion of the assembly, especially a simultaneous translation and rotation, as the assembly moves along the path.

In an embodiment, the apparatus includes at least one track or rail, and preferably a plurality of tracks or rails, which define(s) the path from the first position to the second position. In this way, the apparatus is typically configured to convey or transport the assembly along said at least one track or rail to the second position.

In another aspect, therefore, the invention provides a method of rotating or inverting an assembly (or pre-assembly) during manufacture of a fibre-reinforced composite module, such as a panel module, having an integrated stiffening structure, the method comprising:

conveying or transporting the assembly from a first receiving position to a second discharging position, whereby the assembly follows a path that is configured to rotate or invert the assembly as it is conveyed or transported from the first position to the second position.

As noted already above, the path between the first and second positions along which the assembly is moved or conveyed is preferably an at least partially curved or arcuate path, and desirably an at least partially circular or elliptical path. In this way, the assembly may undergo progressive or gradual rotation or inversion, e.g. with a simultaneous translation, as it moves or travels from the first position to the second position. The axis of rotation (i.e. the axis about which the rotation or inversion effectively occurs) is spaced from the travel path between the first and second positions.

In a further aspect, the present invention provides a system for manufacturing a module, such as a panel module, of fibre-reinforced composite material having an integrated stiffening structure for use in an aircraft or spacecraft, comprising:

a form core assembly station for assembling a plurality of form cores covered with reinforcing fibre layers to form one or more stiffening elements of the stiffening structure;

a form core placement station for receiving assembled form cores from the assembly station and for placing or depositing the assembled form cores in or on a moulding tool; and a turning station to rotate or invert the assembled form cores; wherein the turning station is configured to convey or transport the assembled form cores from the assembly station to the placement station, and wherein the turning station defines a path which is configured to rotate or invert the assembled form cores as they are conveyed or transported to the placement station.

It will be noted that the form cores that are typically used or employed in the system and method are block-like elements, and are preferably formed of metal. As such, an individual form core is typically quite heavy, with a mass in the range of 10 to 50 kg. A full complement of the form cores needed in larger aerodynamic modules, such as wing panel modules and tail panel modules, may be several hundred such that the mass to be borne by the placement station for all of the form cores together may be in excess of 10 tonnes. This mass becomes problematic in turning or inverting all of the assembled form cores for placement in the moulding tool. In particular, the structure required not only to support that weight, but also to rotate it over the dimensions of an aircraft wing through an angle of 180° to invert it accordingly are extreme. An aspect of the present invention, however, overcomes this difficulty through the development of the turning apparatus or turning station which has been devised for turning or inverting the individual groups of assembled form cores before they are introduced into and/or received in the placement station. In this way, the placement station itself can be constructed in a far simpler and more cost effective manner, which also means that the structure can be duplicated more readily to enable multiple production facilities to operate in parallel without prohibitive cost.

In an embodiment, the turning station is configured to convey or transport the assembled form cores to the placement station. In this regard, the turning station may be configured to invert the assembled form cores progressively as they are conveyed or moved to the placement station. The axis of rotation (i.e. about which the rotation or inversion occurs) is spaced at a distance from the path of travel; i.e. it does not lie on the travel path from the first position to the second position. More particularly the turning station may be configured to transport or convey the assembled form cores along a curved path or through an arc to invert or rotate the assembled form cores before they are received in the placement station. In this way, a centre of curvature of the curved or arcuate path may correspond to an axis of rotation for the inversion.

In an embodiment, the assembly station is configured to assemble the plurality of form cores aligned in a row or a linear array to produce an elongate stiffening element for the stiffening structure to be integrated in the panel module. That is, the aligned linear array of form cores covered with reinforcing fibre layers may be pressed together and consolidated to create a continuous ridge or profile of reinforcing fibre layers. To this end, the assembly station may be configured to consolidate and to interconnect the plurality of form cores via connecting elements, such as elongate plate elements, to force the form cores together and to hold them fixed together in this state.

In an embodiment, therefore, the placement station may be configured to receive the assembled form cores from the turning station in one or more rows or linear arrays, with each row or linear array designed or intended to form an elongate structural element or profile of the integrated stiffening structure. For example, each row or linear array covered with the layers of reinforcing fibres may be configured to form or constitute a longitudinal stiffening element in the integrated stiffening structure of the module.

In an embodiment of the invention, the placement station is configured to move between an upper position, at which the assembled form cores are received from the turning station, and a lower position, at which the assembled form cores are placed or deposited into or onto the moulding tool. In this regard, the placement station may include a holder or carrier frame configured to receive and to hold or carry the assembled form cores. This holder or carrier frame is also typically configured to move substantially vertically between the upper position and the lower position. In this way, the placement station in the system of the invention need only move vertically, so that no excessive and unwanted loading is generated in a support structure of the placement station as a result of rotating the massive form core arrays. Rather, the support structure of the placement station may simply be comprised of pillar-like hoist members for vertically moving the form core arrays suspended from the carrier frame above the moulding tool.

In an embodiment, the manufacturing system further includes a reinforcing fibre application station for applying layers of reinforcing fibres (for example, in the form of prepreg layers) to each of the plurality of form cores before the form cores are assembled at the assembly station. In this regard, it will be appreciated by persons skilled in the art that carbon fibre layers for the generation of carbon fibre reinforced polymer (CFRP) composites are preferred in aeronautical applications, although glass fibre layers for glass fibre reinforced polymers (GFRP) and aramid fibre layers for aramid fibre reinforced polymers (AFRP) are also contemplated for the system. The application station may include a draping unit for draping the reinforcing fibres layers (e.g. prepreg layers) over an outer surface of each form core. Furthermore, the application station may include a vacuum unit for drawing the draped reinforcing fibre layers snugly around each form core.

According to another aspect, the present invention provides a method of manufacturing a fibre-reinforced composite module, especially a panel module, having an integrated stiffening structure for use in an aircraft or spacecraft, comprising:

assembling a plurality of form cores covered with reinforcing fibre layers at an assembly station to form or to constitute one or more structural elements for the integrated stiffening structure; and receiving assembled form cores at a placement station from the assembly station for placing or depositing said assembled form cores in or on a moulding tool;

wherein the method includes rotating or inverting the assembled form cores before the assembled form cores are received in the placement station.

In an embodiment, the method includes conveying or transporting the assembled form cores along a path from the assembly station to the placement station, wherein the path is configured to rotate or invert the assembled form cores, especially progressively or gradually, as they are conveyed or transported to the placement station. To this end, the assembled form cores are preferably transported or conveyed along a curved path or through an arc to effect or cause the inversion before they are received in the placement station. During this procedure, a centre of curvature of the curved path or the arc preferably corresponds to an axis of rotation for the said inversion of the assembled form cores.

In an embodiment, assembling comprises: pre-assembling the plurality of form cores aligned in one or more row or linear array; and/or consolidating and interconnecting the plurality of form cores via connecting elements, such as elongate plate elements. Receiving may thus include receiving the pre-assembled form cores from the turning station in one or more rows or linear arrays, whereby each row or linear array is configured to form one or more elongate stiffening elements of the stiffening structure that is integrated in the fibre-reinforced composite module.

In an embodiment of the invention, the method further comprises:

applying one or more layers of reinforcing fibres, e.g. in the form of prepreg layers, to each of the plurality of form cores before assembling the form cores at the assembly station.

According to a further aspect, the present invention provides a vehicle, such as an aircraft, which has a body or frame that includes at least one module having an integrated stiffening structure and being comprised of a fibre-reinforced composite material which is manufactured with a system or by a method according to any of the embodiments of the invention described above.

BRIEF DESCRIPTION OF THE DRAWINGS

For a more complete understanding of the present invention and the advantages thereof, exemplary embodiments of the invention are explained in more detail in the following description with reference to the accompanying drawings, in which like reference characters designate like parts and in which.

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

It will be appreciated that common and/or well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

DETAILED DESCRIPTION

Figure 1:
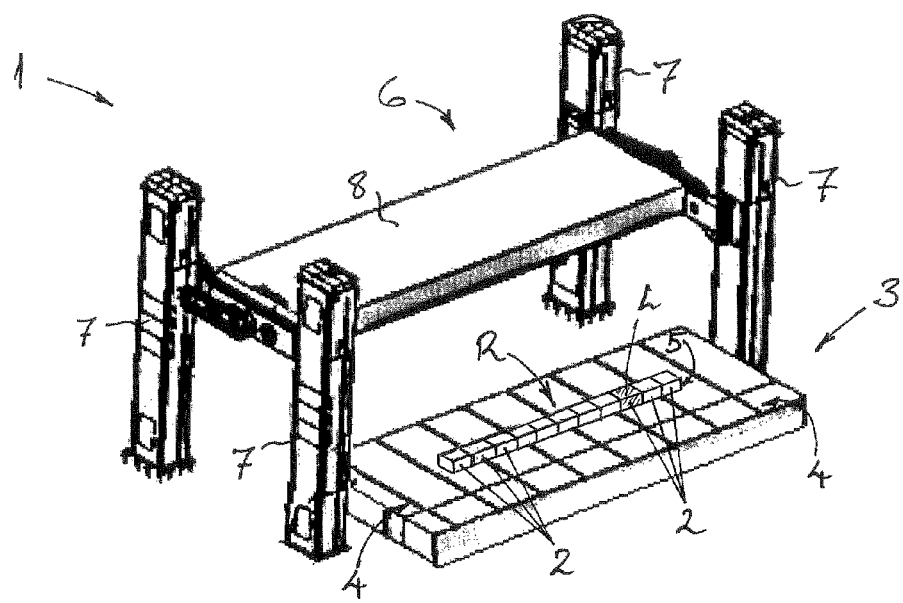
FIG. 1 is a perspective view of a system according to a preferred embodiment of the invention.
Figure 2:
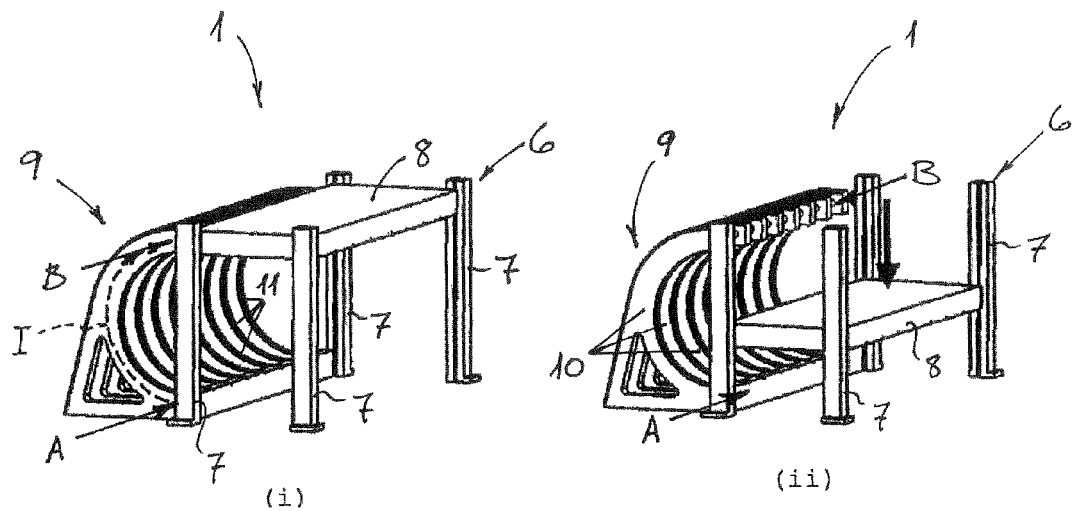
FIG. 2 shows in perspective view two phases (i) and (ii) in operation of a system according to a preferred embodiment of the invention.
Figure 3:
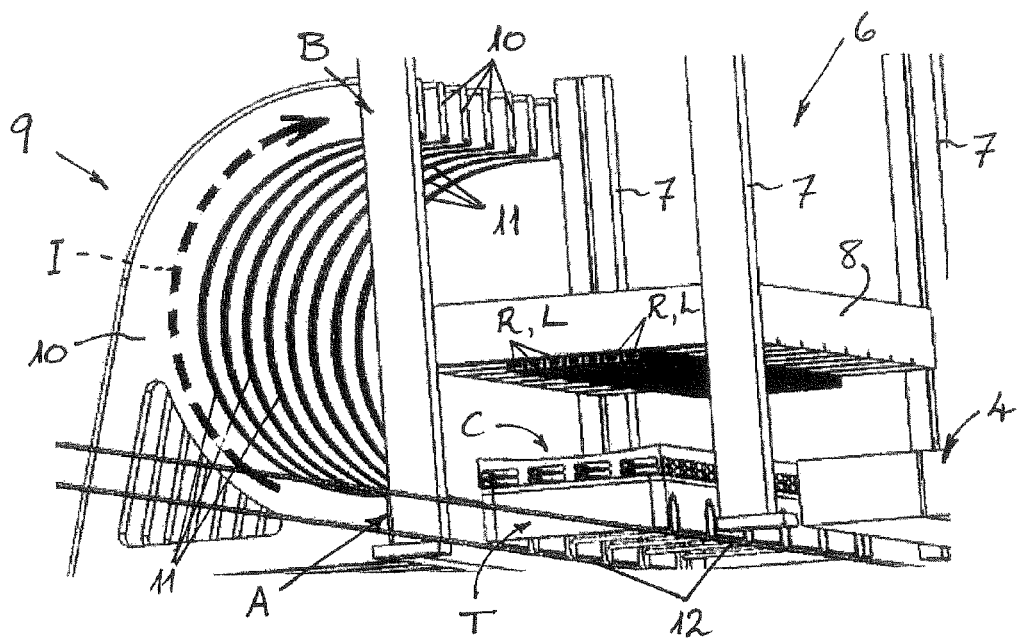
FIG. 3 is a perspective view of part of a system according to a preferred embodiment of the invention.

With reference to FIGS. 1 to 3 of the drawings, a system 1 for manufacturing a panel module P for an aircraft according to a preferred embodiment of the invention is illustrated schematically. The panel module P to be formed with this system 1 is comprised of a fibre-reinforced polymer, such as CFRP, and includes an integrated stiffening structure C with several elongate stiffening elements S, such as stringers, integrally formed on an inner side of an outer skin of the panel module P.

As will be understood by skilled persons, the panel skin or aerodynamic skin of the CFRP panel module takes its three-dimensional shape from an inner surface of a moulding tool T, which is laid-up with layers of reinforcing carbon fibers. These fibre layers may be dry fibre layers to be impregnated with resin in a resin transfer moulding (RTM) process, such as vacuum-assisted resin transfer moulding (VARTM), and then subsequently cured in an oven or autoclave, as is known in the art. Alternatively, the fibre layers laid-up in the mould may be pre-impregnated with resin (i.e. "prepreg" layers) so as to then be directly cured in the oven or autoclave.

Before the panel skin or aerodynamic skin of the panel module may undergo the moulding and curing, however, the stiffening structure C of the panel module P is built-up and is laid in the moulding tool T in intimate contact with the panel skin so that it is also present during any infusion and/or curing procedure. In this way, the stiffening structure C can then be co-cured and thereby integrated with the skin of the panel module. The system 1 of the invention is especially directed to the formation of the integrated stiffening structure C and its introduction into moulding tool T for subsequent curing.

In this regard, the stiffening structure C to be integrated with the skin of the panel module P comprises a plurality of elongate stiffening elements or profiles S which are designed to provide longitudinal and lateral rigidity to the panel module. These elongate profiles or stiffening elements S are produced or built-up in the system 1 by assembling a number of individual form cores 2 in a linear array as will now be described. In this embodiment, the form cores 2 are generally rectangular cuboid or block-like components (e.g. of metal), which can be assembled in rows or lines R, as seen in FIG. 1.

Thus, the system 1 includes a form core assembly station 3 to which a plurality of the form cores 2 are transported via a transport or conveying mechanism (not shown). Before reaching the assembly station 3, however, the form cores 2 are firstly provided with layers L of carbon fibres, e.g. in the form of prepreg sheets or layers, applied to each of the blocks 2. To build-up the stiffening structure C for the panel module P, a series of the form cores or blocks 2, each being covered with carbon fibre prepreg layers L, are transported or conveyed to the assembly station 3 and aligned in a row or linear array R on an assembly table 4 of the assembly station 3. To this end, the assembly table 4 has an elongate bearing plate or strip element 5, upon which each of the form cores 2 in that row or linear array R rests. Further, that elongate bearing plate 5 is configured to interconnect with the plurality of form cores 2 and to consolidate those forms into a compact linear array. In particular, the core blocks 2 are typically pressed together at the assembly station 5 and then, in this compact state, fixed to the common bearing plate or strip 5.

After a linear row or array of form cores 2 has been combined or pre-assembled via the bearing plate 5 on the table 4 at the assembly station 3, that row or array is then transferred to a form core placement station 6 which is designed for placing or depositing the assembled linear array R of form cores 2 into or onto the moulding tool T. As this transfer occurs, a new row or linear array R of form cores 2 may then be pre-assembled to produce or generate the next stiffening element or profile for the integrated stiffening structure C. In this regard, it will be appreciated by skilled persons that a panel module, e.g. of an aircraft wing, will usually include several stiffener profiles arranged across an inner stiffening structure of the panel. In other words, a single panel module typically requires several (e.g. from 5 to 15) individual rows or linear arrays or pre-assemblies R of form cores 2 covered with reinforcing fibre layers L to be placed or incorporated into the moulding tool T.

Figure 4:
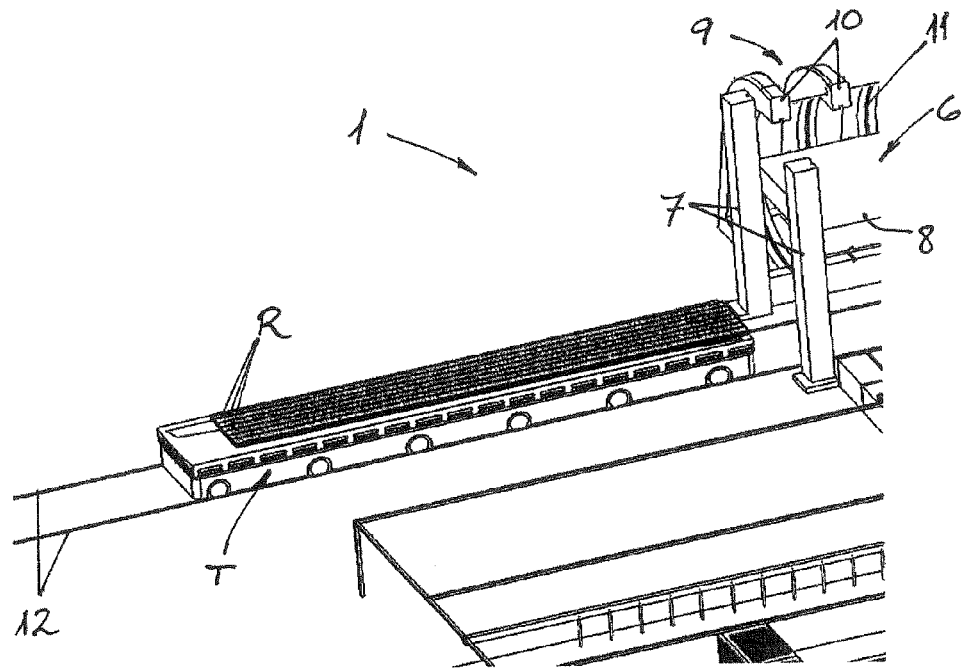
FIG. 4 is a perspective view of part of a system according to a preferred embodiment of the invention.

With reference to FIGS. 2 to 4 of the drawings, the transfer of the assembled linear rows or arrays of form cores 2 to the placement station 6 in the system 1 of this embodiment will now be described. In particular, it will be noted that each assembly table 4 of the assembly station 3 is itself movable in a lateral direction through a support structure 7 of the placement station 6. In this regard, it will be seen that the support structure 7 of the placement station 6 comprises four posts or pillars, which support a rectangular carrier frame 8 of the placement station 6 and operate as hoists for moving the carrier frame 8 vertically between an upper position and a lower position, as seen in FIG. 2(*i*) and FIG. 2(*ii*). This carrier frame 8 of the placement station 7 is configured to receive and to hold or carry the pre-assembled linear rows or arrays R of form cores 2 as the placement station 6 moves from the upper position to the lower position.

As is apparent from drawing FIGS. 2 to 4, the system 1 also includes a turning station 9 comprising an apparatus designed or configured both to transport or convey the individual linear arrays of assembled form cores 2 to the rectangular carrier frame 8 of the placement station 6 and, at the same time, to invert the pre-assembled form cores 2 prior to the linear arrays R being introduced or received into the carrier frame 8 of the placement station. The turning station 9 is able to perform both of these functions by providing a travel path I for transporting or conveying the pre-assembled form cores 2. In particular, the turning station or apparatus 9 comprises a series of curved beams 10 arranged substantially parallel and spaced apart, with each beam 10 providing a rail or track 11, which together define a curved or semi-circular path I configured to convey or transport the assembled row R of form cores 2 from the assembly table 4 at a first, lower position A (i.e. adjacent a lower end of the beams 10) to the carrier frame 8 of the placement station 6 at a second, upper position B. In so doing, movement of the pre-assembled rows R of form cores 2 along the curved or arc path I transcribed by the beams 10 or tracks 11 of the turning station 9 rotates and inverts the elongate array of form cores 2 about a centre of curvature of the tracks 11 as these form cores 2 are moved towards the carrier frame 8 of the placement station 6.

The linear arrays R of assembled form cores 2 prepared for the panel module P are transferred individually or one at a time to the carrier frame 8, into which they are then loaded and set at predetermined spacings from one another required for the stiffening structure C of the panel module P to be produced. Once all of the assembled form cores 2 covered with their respective CFRP prepreg layers L have been loaded into or received into, and are held by, the carrier frame 8, the placement station 6 can be moved from the upper position B, at which it was loaded with the assembled form cores 2, to the lower position A (as shown in FIG. 2(*ii*) and FIG. 3) for placing or depositing the assembled rows R of form cores 2 into or onto the moulding tool T, which is already laid-up with pre-impregnated fibre layers to form the panel skin.

With reference to FIG. 3, after all of the linear arrays R of assembled form cores 2 have been transferred via the turning station 9 from the assembly table 4 to the carrier frame 8, the assembly table 4 is moved laterally out from the below the placement station 6. The moulding tool T is then able to be moved into position directly below the carrier frame 8 on rails or tracks 12. FIG. 3 shows the rows or linear arrays R of the assembled form cores 2 in the carrier frame 8 as they are being lowered towards the moulding tool T along tracks in the pillars 7. In this way, the form cores 2 are deposited on the moulding tool T via the placement station 6, such that they may form the stiffener elements or profiles S on an inner side of the panel module P during the subsequent curing phase of the moulding procedure. Referring to FIG. 4, for example, the moulding tool T carrying the all of the now inverted linear arrays R of assembled form cores 2 is further transported along rails or tracks 12 to a curing station (not shown) where the now fully laid-up moulding tool T carrying the pre-impregnated fibre layers is moved (e.g. on rails or tracks 12) into an autoclave or oven for curing.

Figure 5:
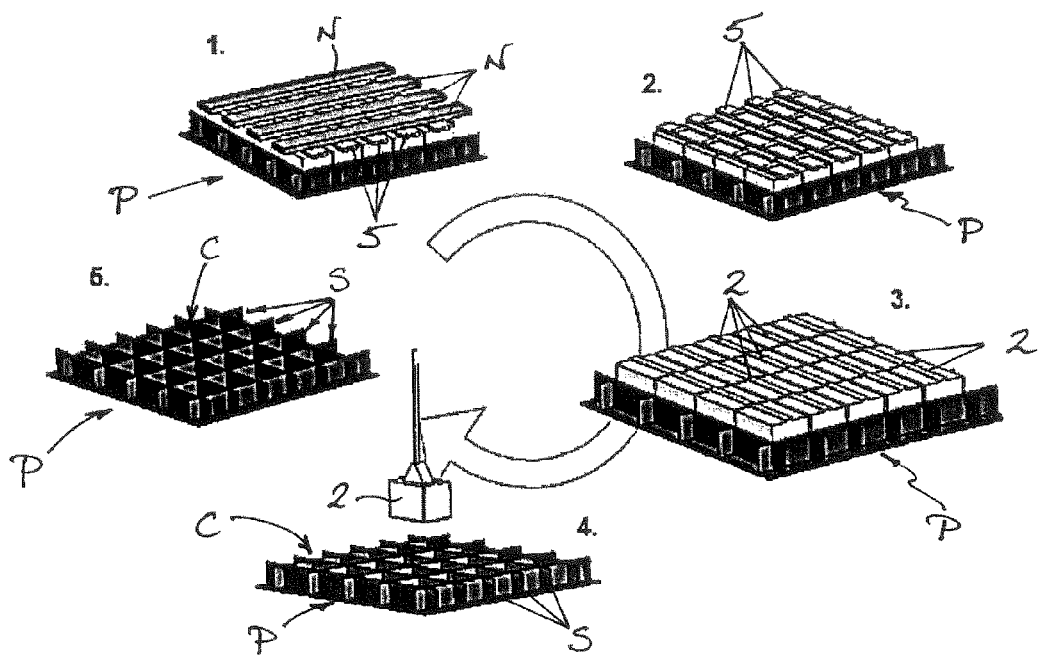
FIG. 5 shows steps 1 to 5 in the removal of the form cores or core blocks from a integrated stiffening structure of a finished panel module.

After curing, the moulding tool T is cooled. Thereafter, the linear arrays R of assembled form cores 2 can be dismantled and removed from the newly fabricated panel module P. As seen in FIG. 5, for example, removal or dismantling of the rows or linear arrays R of the assembled form cores 2 may proceed in a series of steps, as shown in the separate images 1. to 5. of FIG. 5. Image 1 of FIG. 5 shows or represents the panel module P with the integral, co-cured integrated stiffening structure C after its removal the from the moulding tool T. Image 2 of FIG. 5 shows removal of connection plates N, with which a spacing between each of the adjacent linear arrays R of assembled form cores was fixed. Image 3 of FIG. 5 shows the removal of the bearing plates 5, with which each of the individual form cores 2 was held assembled or fixed in their rows or linear arrays R. Image 4 of FIG. 5 shows the removal of the individual form cores 2 from the panel module P, and image 5 of FIG. 5 shows a part of the newly manufactured panel module P.

Figure 6:
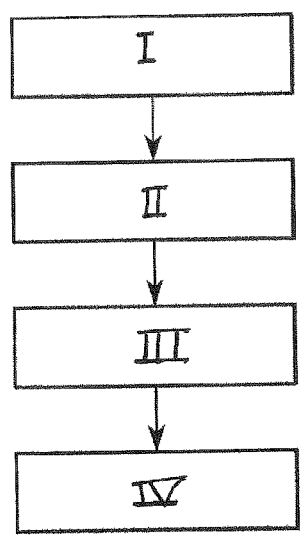
FIG. 6 is a flow diagram which schematically illustrates a method according to a preferred embodiment.

Referring now to FIG. 6 of the drawings, a flow diagram is shown that schematically illustrates the steps in a method of manufacturing a panel module P having an integral stiffening structure C and comprised of a fibre-reinforced composite material for use in an aircraft or spacecraft according to the embodiment of the invention as described above with reference to FIGS. 1 to 3. In this regard, the first box I of FIG. 6 represents a step of applying layers L of reinforcing fibres, e.g. in the form of prepreg layers, to each of a plurality of form cores or blocks 2. The second box II then represents the step of pre-assembling a plurality of the form cores 2 covered with the reinforcing fibre layers L at an assembly station 3 to form or to constitute one or more stiffening elements S of the stiffening structure C to be integrated in the panel module. The third box III represents the step of turning or inverting the assembled form cores 2 as they are conveyed or transported from assembly station 3 to a placement station 6 for placing or depositing the pre-assembled form cores 2 in or on a moulding tool T. The final box IV in FIG. 6 of the drawings then represents the step of moving the placement station 6 to place or deposit the assembled form cores 2 into or onto the moulding tool T.

Figure 7:
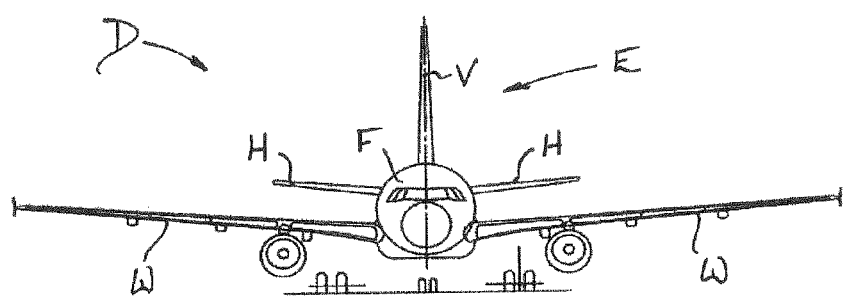
FIG. 7 is a schematic illustration of an aircraft in which one or more panel module manufactured according to an embodiment of the invention is installed.

With reference now to FIG. 7, an aircraft D is shown with an airframe comprising a fuselage F, wings W, and empennage E, including vertical stabiliser V and horizontal stabilizers H. The airframe, and especially the wings W and/or empennage E, includes one or more CFRP panel module which is manufactured with a system or by a method according to any of the embodiments of the invention described above.

Figure 8:
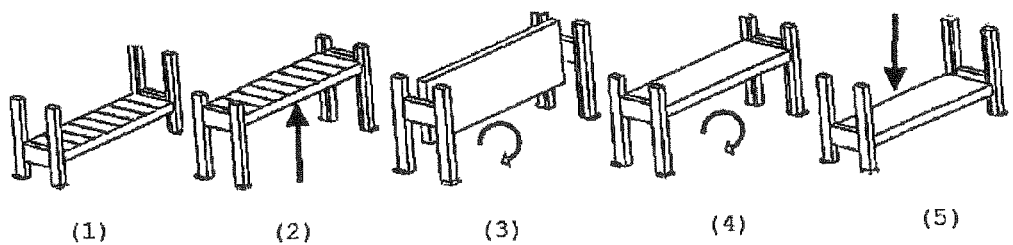
FIG. 8 shows in perspective view phases (1) to (5) in the operation of a system that does not form part of the invention.

Finally, with reference to FIG. 8, phases (1) to (5) in the operation of an alternative system that does not form part of the invention are shown to help explain the advantages of the system 1 described above. The alternative system illustrated in FIG. 8 relies upon a modified placement station to perform both inverting of the assembled form cores and the placing of those the assembled form cores in a moulding tool. That is, in phase (1), all of the assembled form cores are loaded into a rectangular carrier frame of the modified placement station at a lower position. In phase (2), the loaded carrier frame is moved to an upper position where, in phases (3) and (4), it is then rotated through 180° to invert the assembled form cores. This is a pure rotation about a longitudinal axis of the carrier frame, with the rotational axis located of the vertical path from the upper position to the lower position. In phase (5), the assembled form cores are then moved to back a lower position for placement into a moulding tool. As the full set of form cores required in larger aerodynamic panel modules, such as wing panel and tail panel modules, may have a mass of 20 tonnes, the modified placement station of FIG. 8 must be built strong enough to withstand incredibly high forces and bending moments during such an operation. This, in turn, requires a complex, expensive and very heavy structure, making a duplication of production lines difficult and also prohibitively expensive. As a result, this can lead to long production times and production bottle-necks.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The invention claimed is:

1. A turning apparatus for rotating or inverting a pre-assembly during manufacture of a fibre-reinforced composite module having an integrated stiffening structure,
   wherein the apparatus is configured to convey or transport the pre-assembly from a first position, at which the pre-assembly is received by the apparatus, to a second position, at which the pre-assembly is discharged from the apparatus;
   wherein the apparatus includes at least one track or rail defining a path from the first position to the second position;
   wherein the apparatus is configured to convey or transport the pre-assembly along said at least one track or rail to the second position; and
   wherein the path is configured to rotate or invert the pre-assembly as the pre-assembly is conveyed or transported to the second position.

2. The turning apparatus according to claim 1, wherein the path is configured to rotate or invert the pre-assembly progressively as the pre-assembly conveyed or transported from the first position to the second position.

3. The turning apparatus according to claim 2, wherein the path from the first position to the second position is at least partially curved or arcuate, and
   wherein a centre of curvature of the curved or arcuate path corresponds to an axis of rotation for the pre-assembly as the pre-assembly is rotated or inverted.

4. A system for producing a fibre-reinforced composite module having an integrated stiffening structure for an aircraft or spacecraft, comprising:
   a form core assembly station for assembling a plurality of form cores covered with reinforcing fibre layers to constitute at least one stiffening element for the integrated stiffening structure;
   a form core placement station which receives assembled form cores from the assembly station for placing or depositing said assembled form cores in or on a moulding tool; and
   a turning station for rotating or inverting the assembled form cores, wherein the turning station is configured to convey or transport the assembled form cores from the assembly station to the placement station, wherein the turning station defines a path configured to rotate or invert the assembled form cores as the assembled form cores are conveyed or transported to the placement station, and
   wherein the turning station is configured to transport or convey the assembled form cores along a curved path defined by at least one track or rail to rotate or invert the assembled form cores before the assembled form cores are received in the placement station.

5. The system according to claim 4,
   wherein a centre of curvature of the curved path or arc corresponds to an axis of rotation for the form cores.

6. The system according to claim 4, wherein the placement station is configured to receive the assembled form cores from the turning station in one or more rows or linear arrays, wherein each row or linear array forms elements of the structure, and/or
   wherein the placement station is configured to move between an upper position at which the assembled form cores are received from the turning station and a lower position at which the assembled form cores are placed or deposited in or on the moulding tool.

7. The system according to claim 4, further comprising:
a reinforcing fibre application station for applying layers of reinforcing fibres to each of the plurality of form cores before the form cores are assembled at the assembly station;
wherein the system further includes a transport or conveying mechanism to transport or convey the form cores covered with reinforcing fibre layers to the assembly station from the application station.

8. The system according to claim 4, wherein the assembly station is configured to assemble the plurality of form cores aligned in a row or a linear array to produce an elongate structural element for the integrated stiffening structure.

9. A method of manufacturing a fibre-reinforced composite module, with integrated stiffening structure for an aircraft or spacecraft, comprising:
assembling a plurality of form cores covered with reinforcing fibre layers at an assembly station to constitute one or more structural elements for the integrated stiffening structure; and
conveying or transporting the assembled form cores along a path defined by at least one track or rail from the assembly station to the placement station, wherein the path is configured to rotate or invert the assembled form cores as the assembled form cores are conveyed or transported to the placement station,
receiving assembled form cores at a placement station from the assembly station for placing or depositing said assembled form cores in or on a moulding tool; and
rotating or inverting the assembled form cores before the assembled form cores are received in the placement station.

10. The method according to claim 9, wherein the assembled form cores are transported or conveyed along a curved path or through an arc to effect or cause the inversion before the assembled form cores are received in the placement station, a centre of curvature of the curved path or the arc corresponding to an axis of rotation for the assembled form cores.

11. The method according to claim 9, wherein assembling comprises:
assembling the plurality of form cores aligned in one or more row or linear array; and/or
wherein receiving comprises: receiving the assembled form cores from the turning station in one or more rows or linear arrays, whereby each row or linear array is configured to form at least one element of the integrated stiffening structure.

* * * * *